US006922889B2

(12) United States Patent
Tsai

(10) Patent No.: US 6,922,889 B2
(45) Date of Patent: Aug. 2, 2005

(54) SHIFTING DEVICE FOR MANUFACTURING CONTINUOUS TERMINALS

(76) Inventor: Chou Hsuan Tsai, 15F, No. 4, Lane 127, Sec. 1, Fu-Hsing Rd., Hsin-Chuang City, Taipei Hsien (TW)

( * ) Notice: Subject to any disclaimer, the term of this patent is extended or adjusted under 35 U.S.C. 154(b) by 662 days.

(21) Appl. No.: 10/027,535

(22) Filed: Dec. 20, 2001

(65) Prior Publication Data

US 2003/0115745 A1 Jun. 26, 2003

(51) Int. Cl.[7] .................................................. B23P 19/00

(52) U.S. Cl. ............................ 29/759; 29/748; 29/747; 29/745; 29/753; 29/33 M; 29/874; 29/884; 29/825; 29/827

(58) Field of Search ........................ 29/745–755, 33 M, 29/874–884

(56) References Cited

U.S. PATENT DOCUMENTS 5,088,192 A * 2/1992 Dempsey ............... 29/890.037

* cited by examiner

*Primary Examiner*—Rick Kiltae Chang
(74) *Attorney, Agent, or Firm*—Pro-Techtor International Services

(57) ABSTRACT

A shifting device for shifting two rows of continuous terminals includes a body and a shaft. The body is formed with a hole and an inlet and an outlet both communicating with the hole. A direction into the inlet and a direction out of the outlet are the same. The inlet is shifted a predetermined distance away from the outlet. The shaft is fitted with the hole of the body and defines a spiral channel with the body after fitting with the hole of the body. The spiral channel corresponds to the inlet and the outlet of the body According to the structure, one row of the continuous terminals enters the body from the inlet and travels along the spiral channel and travels out of the body from the outlet with a predetermined distance shifted away from the other row of the continuous terminals.

4 Claims, 8 Drawing Sheets

SHIFTING DEVICE FOR MANUFACTURING CONTINUOUS TERMINALS

BACKGROUND OF THE INVENTION

1. Field of the Invention

The invention relates to a shifting device, in particular to a shifting device for shifting continuous terminals.

2. Description of the Related Art

FIG. 1 is a schematic illustration showing a conventional process for pressing continuous terminals. As shown in FIG. 1, two rows of continuous terminals 12 and 14 are formed by pressing a continuous copper band 10 using a press die. Then, the two rows of continuous terminals 12 and 14 are cut along a separation region 16. Thus, it is convenient to form two rows of continuous terminals at one time.

In the above-mentioned manufacturing processes, although it is convenient to form two rows of continuous terminals at one time, the material can not be optimized in this terminal arrangement. That is, because regions 17 between any two adjacent terminals are the non-used parts, a lot of waste material during the pressing processes may be formed, thereby increasing the material costs.

FIGS. 2 and 3 are schematic illustrations showing conventional pressing processes without waste material. As shown in FIGS. 2 and 3, two rows of terminals are arranged opposite to each other, and are pressed, cut, and crimped. Specifically, a copper band 10 is pressed and cut by a press die 22 to form two rows of opposite continuous terminals 18 and 20. The two rows of continuous terminals 18 and 20 are closely and oppositely crossed to each other, and no space is left for pressing and crimping. Thus, the two rows of continuous terminals 18 and 20 have to travel suitable strokes so that the two rows of continuous terminals 18 and 20 can be separated for being pressed and crimped. That is, after the copper band 10 is pressed and cut into two rows of oppositely continuous terminals 18 and 20 using the press die 22, the terminals 18 and 20 are wrapped around the space 27 between the die seat 25 and the base 26 of the machine 21 and then travel to the two sides in front of the press die 22. The two rows of continuous terminals 18 and 20 can be separated by the large wind and can enter, from the two sides, the press die 22 to be pressed and crimped.

There are so many disadvantages in the above-mentioned manufacturing processes that the manufacturing processes are difficulty to be implemented. The disadvantages are described in the following.

1. Since the two rows of the continuous terminals 18 and 20 are relaxed when the large wind of the two rows is done, each of the two rows has to be driven by individual power. Thus, there should be three sets of feeding power so as to drive the copper band and the two rows of continuous terminals 18 and 20.

2. Since the two rows of terminals 18 and 20 enter, from the two sides of the copper band 10, the press die 22 simultaneously for being pressed and crimped, the operation area of the press die 22 is relatively large. The press die 22 has to possess a relatively high property with precision so as to meet the precise requirement of the terminals. Therefore, the costs of the press die may be relatively high.

SUMMARY OF THE INVENTION

It is therefore an object of the invention to provide a shifting device for shifting continuous terminals by a suitable distance after the continuous terminals travel a distance. Thus, one row of opposite continuous terminals can be shifted away from the other row of opposite continuous terminals. In addition, the two rows of continuous terminals after being shifted travel in parallel. Thus, the pressing and crimping processes can be simplified.

To achieve the above-mentioned objects, a shifting device for shifting continuous terminals includes a body and a shaft. The continuous terminals include a first row of continuous terminals and a second row of continuous terminals opposite to the first row of continuous terminals. The body is formed with a hole and an inlet and an outlet both communicating with the hole. A direction into the inlet and a direction out of the outlet are the same. The inlet is shifted a predetermined distance away from the outlet. The shaft is fitted with the hole of the body and defines a spiral channel with the body after fitting with the hole of the body. The spiral channel corresponds to the inlet and the outlet of the body. The second row of continuous terminals enters the spiral channel from the inlet and goes out of the spiral channel from the outlet while the first row of continuous terminals travels over the inlet such that the second row of continuous terminals is shifted the predetermined distance away from the first row of continuous terminals at the outlet. According to the structure, the second row of continuous terminals enters the body from the inlet and travels along the spiral channel. Then, the second row of continuous terminals travels out of the body from the outlet with a predetermined distance shifted away from the first row of continuous terminals. Thus, the processes for manufacturing terminals without waste material can be simplified.

DETAIL DESCRIPTION OF THE INVENTION

Figure 4:
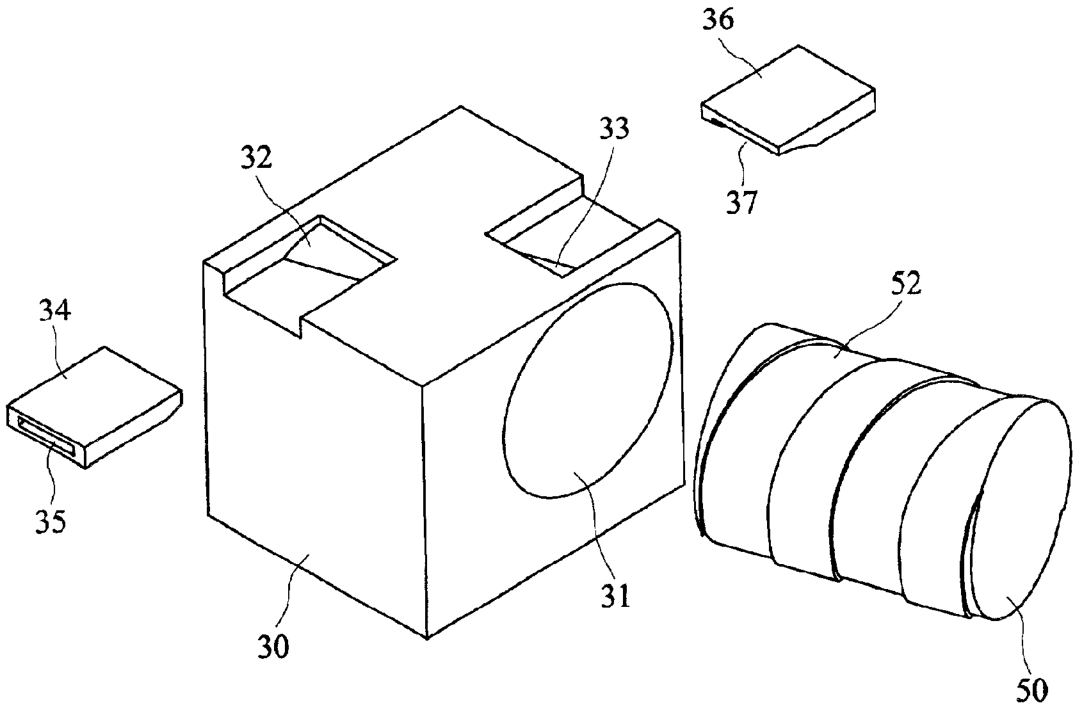
FIG. 4 is a pictorially exploded view showing a preferred embodiment of the invention.
Figure 5:
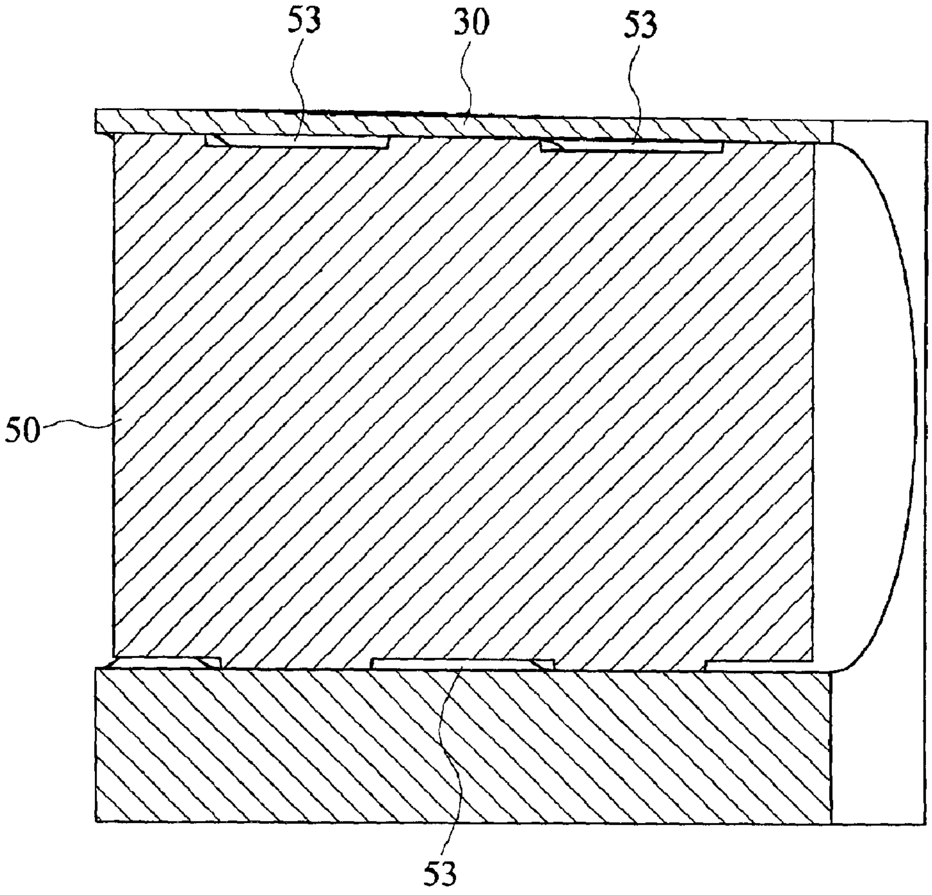
FIG. 5 is a cross-sectional view showing the combination of the preferred embodiment of the invention.
Figure 6:
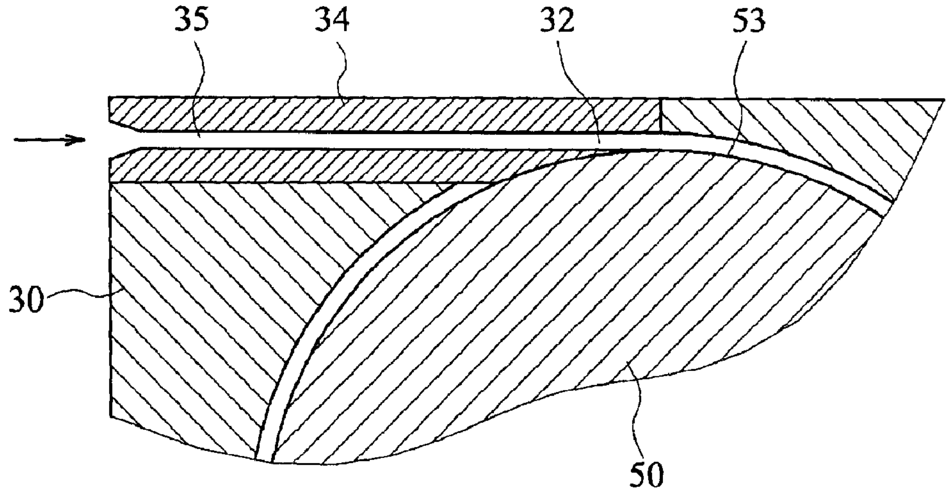
FIG. 6 is a cross-sectional view showing the position of the inlet of the preferred embodiment of the invention.
Figure 7:
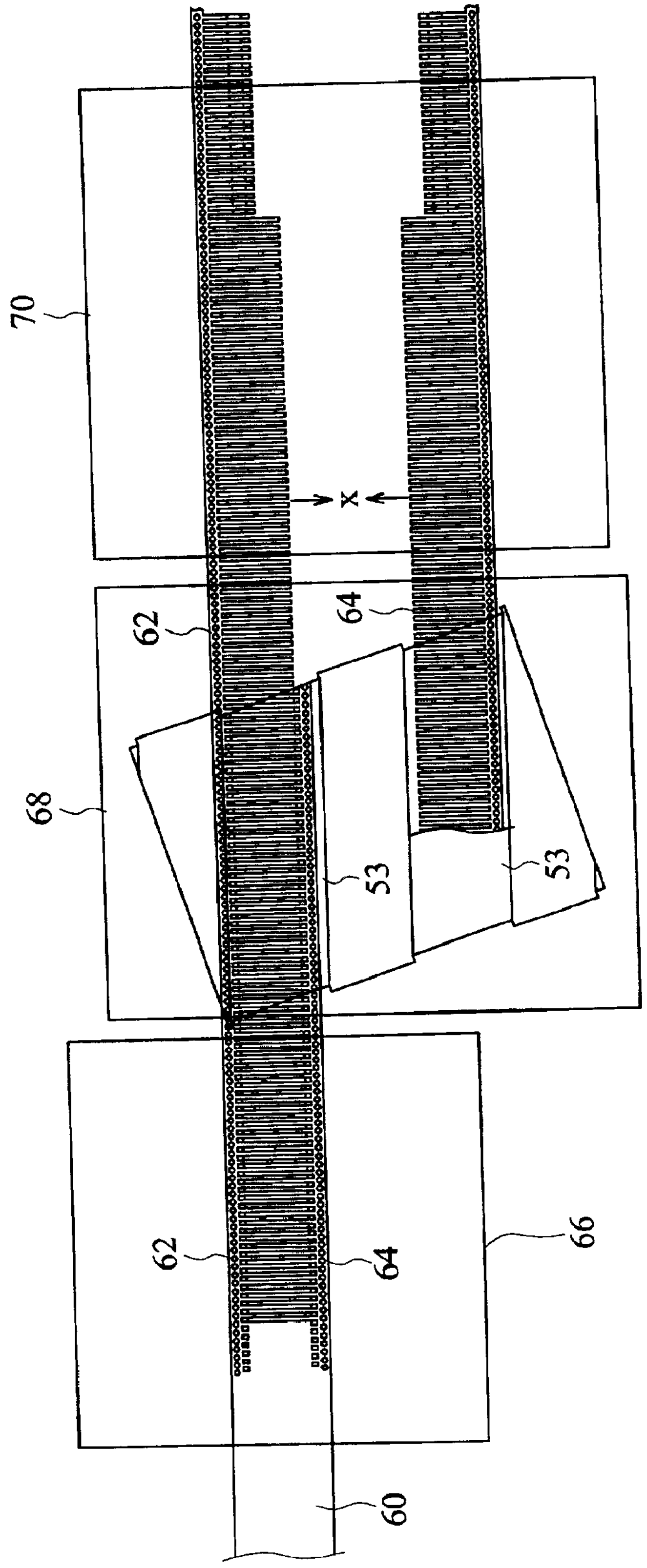
FIG. 7 is a schematic top view showing a first implementation condition of the preferred embodiment of the invention.

Referring to FIGS. 4 to 6, the shifting device for shifting continuous terminals in accordance with a preferred embodiment of the invention includes a body 30, two conduits 34 and 36, and a shaft 50. The continuous terminals include a first row of continuous terminals 62 and a second row of continuous terminals 64 opposite to the first row of continuous terminals 62, as shown in FIG. 7.

The body 30 is formed with a hole 31 and an inlet 32 and an outlet 33 both communicating with the hole 31. The direction into the inlet 32 and the direction out of the outlet 33 are the same. The inlet 32 is shifted a distance away from the outlet 33.

The two conduits 34 and 36, through which the second row of continuous terminals 64 passes, are horizontally placed on the inlet 32 and outlet 33 of the body 30. The conduit 34 is formed with an inner passageway 35 communicating with the hole 31 via the inlet 32. The conduit 36 is formed with an inner passageway 37 communicating with the hole 31 via the outlet 33.

The shaft 50 is fitted with the hole 31 of the body 30 and is formed with a spiral slot 52 on the surface thereof. The depth of the slot 52 is slightly greater than the thickness of the terminal band (or the continuous terminals). A spiral channel 53 corresponding to the inlet 32 and the outlet 33 of the body is formed within the body when the shaft 50 is fitted with the hole 31 of the body.

According to the above-mentioned structure, after one row of the continuous terminals enters the body 30 through the inner passageway 35 of the conduit 34, the continuous terminals wrap around the shaft 50 and travel along the spiral channel 53. Finally, the row of the continuous terminals exits the conduit 36 through the outlet. Thus, the two rows of the continuous terminals can be shifted.

Alternatively, the above-mentioned spiral channel 53 can also be achieved by providing a spiral slot on the surface of the shaft 50, or by providing a spiral slot on the inner surface of the hole 31 of the body 30. In this case, although no slot is formed in the shaft 50, the spiral channel also can be formed after the shaft 50 is fitted with the hole 31 of the body.

FIG. 7 shows a first implementation condition of the invention and shows a process for pressing the continuous terminals without waste material. As shown in FIG. 7, a copper band 60 is pressed and cut into first and second rows of continuous terminals 62 and 64 by a press die 66. When the two opposite rows of continuous terminals 62 and 64 pass through a shifting device 68 of the invention, the second row of continuous terminals 64 enters the spiral channel 53 from the inlet 32 and goes out of the spiral channel 53 from the outlet 33 while the first row of continuous terminals 62 does not enter the shifting device 68 but travels over the inlet 32 and travels forward directly. The second row of the continuous terminals 64 travels forward along the spiral channel 53 of the shifting device and is shifted a distance X away from the first row of the continuous terminals 62. Then, the two rows of continuous terminals 62 and 64 enter, in parallel, the press die 70 for being pressed and crimped with a separation distance X. That is, the second row of continuous terminals 64 is shifted the distance X away from the first row of continuous terminals 62 at the outlet 33.

It should be clearly understood that the invention has the following advantages.

1. Since it is possible for one row of continuous terminals to be shifted relative to the other row of continuous terminals, the two rows of opposite continuous terminals can be separated and travel, in parallel, with a separation distance under only one driving power. This advantage is clearly understood in comparison with the prior art in which three sets of driving power are needed.

Figure 1:
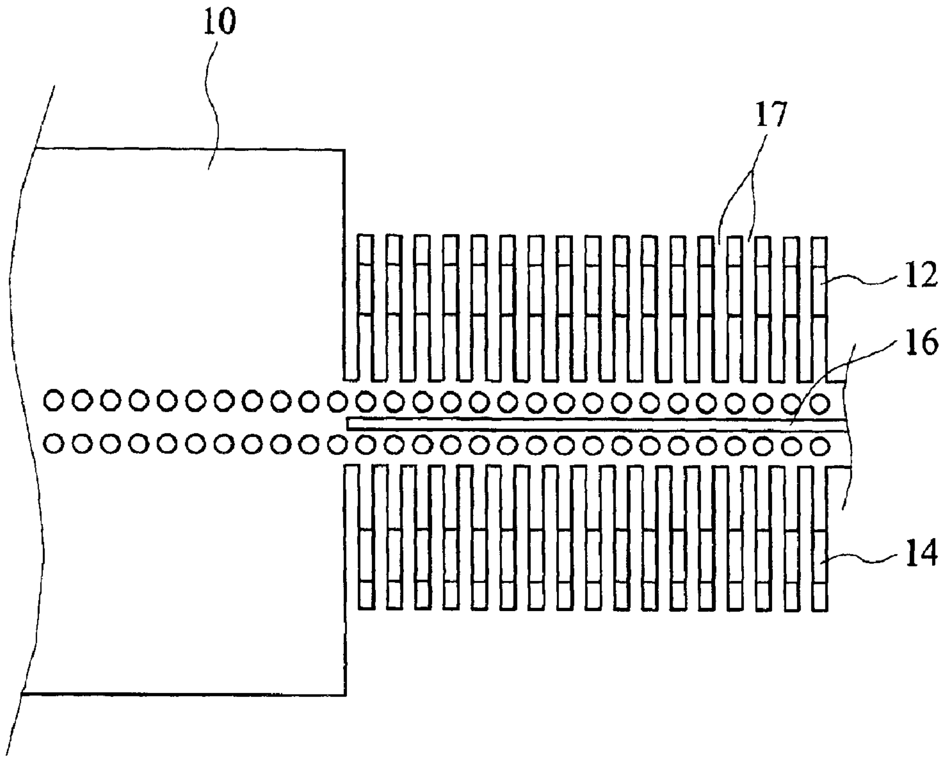
FIG. 1 (PRIOR ART)
FIG. 1 is a schematic illustration showing a conventional process for pressing continuous terminals.
Figure 2:
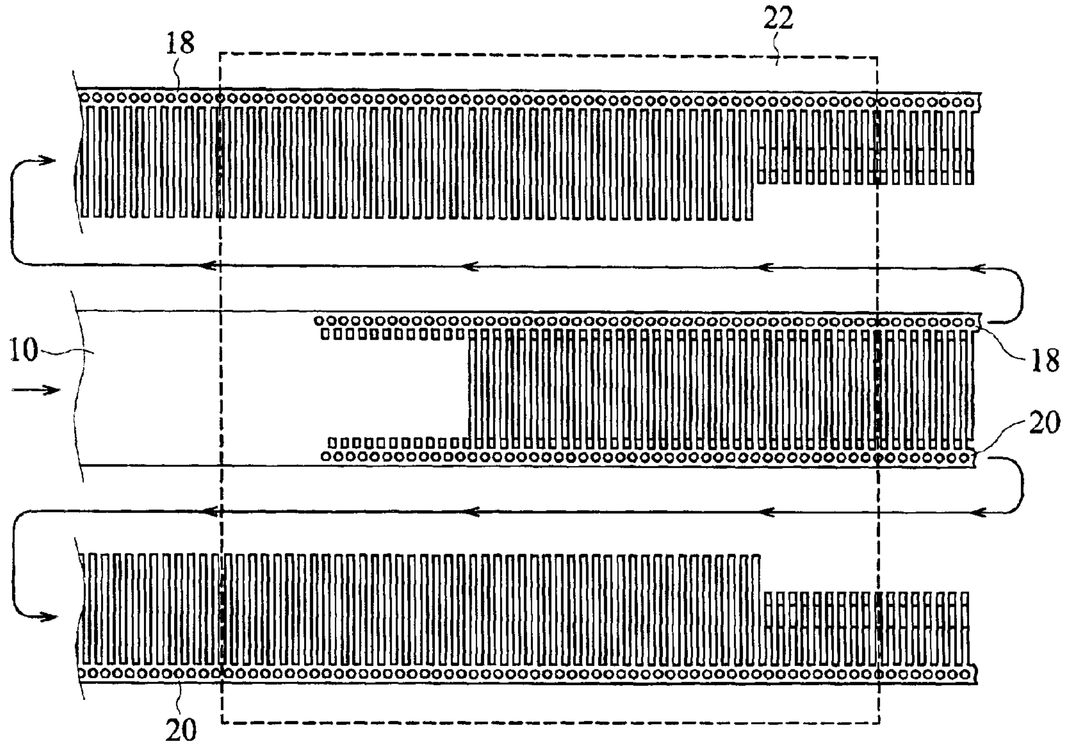
FIG. 2 (PRIOR ART)
FIG. 2 is a schematic top view showing a conventional pressing process without waste material.
Figure 3:
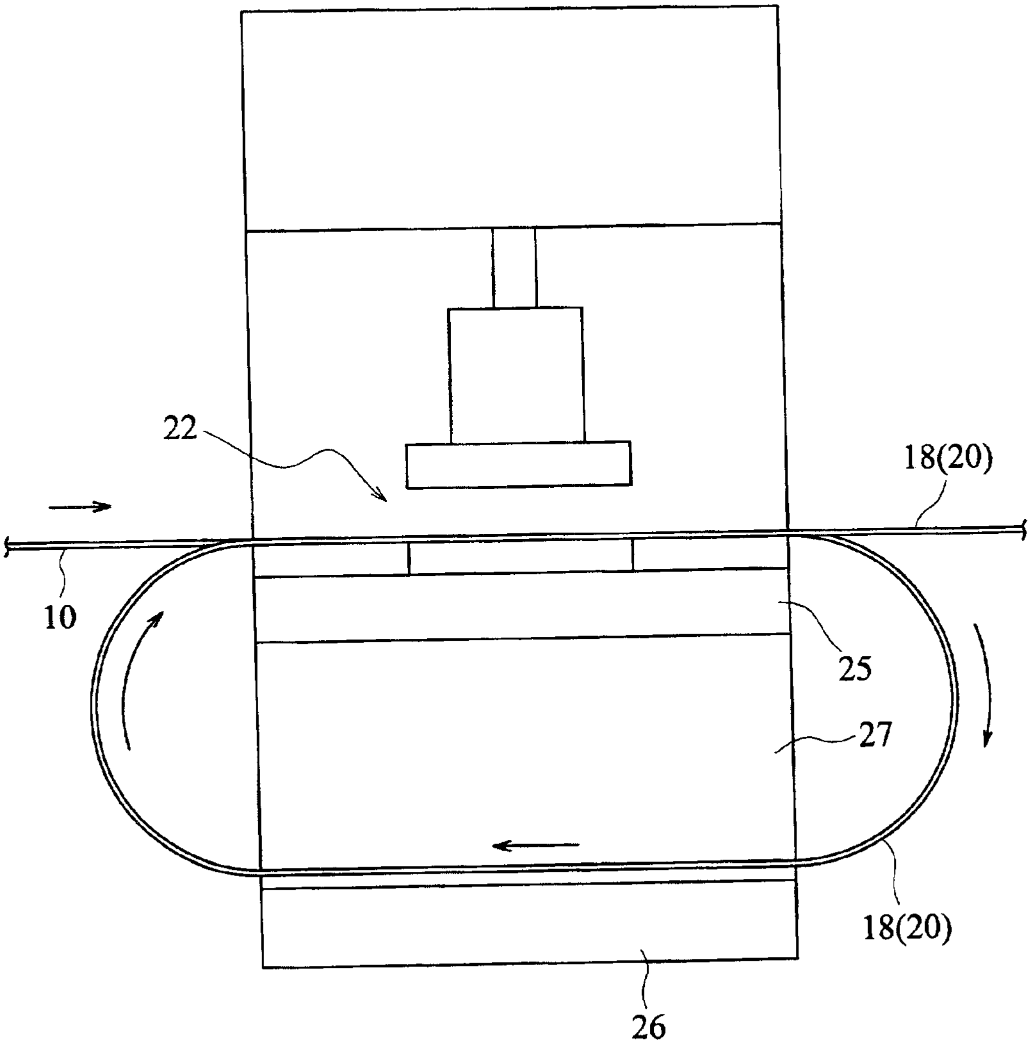
FIG. 3 (PRIOR ART)
FIG. 3 is a schematic side view showing a conventional pressing process without waste material.

2. The shifting device of the invention can separate the two rows of opposite continuous terminals so that the two rows can travel with a separation distance. Thus, the two rows of continuous terminals can be easily pressed and crimped, as shown in FIG. 1. Accordingly, the precision degree of the press die can be easily controlled and the costs of the press die can be lowered.

Figure 8:
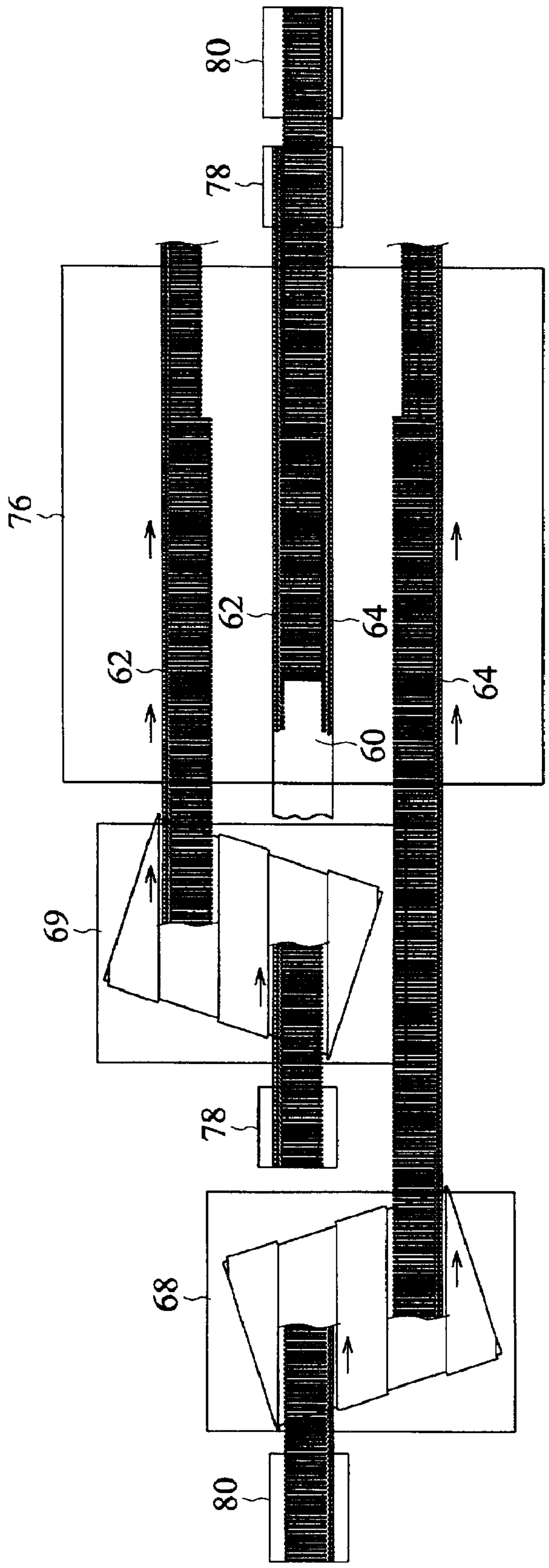
FIG. 8 is a schematic top view showing a second implementation condition of the preferred embodiment of the invention.
Figure 9:
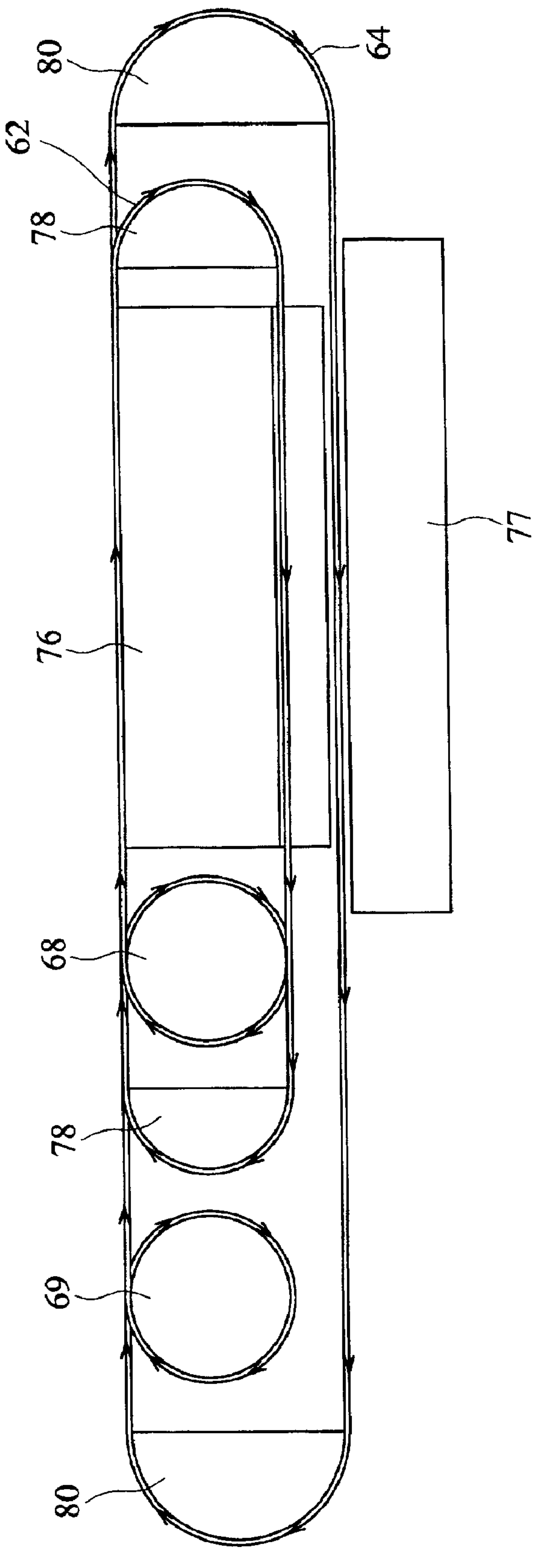
FIG. 9 is a schematic side view showing the second implementation condition of the preferred embodiment of the invention.

FIGS. 8 and 9 show a second implementation condition of the invention and show a process for pressing the continuous terminals without waste material. As shown in FIGS. 8 and 9, a copper band 60 is pressed and cut into two rows of continuous terminals 62 and 64 by a press die 76. The row of the continuous terminals 62 passes a first semi-circular rail 78, turns around and passes the space between the press die 76 and the die seat 77. Then, the row of the continuous terminals 62 passes another first semi-circular rail 78, turns around and enters a shifting device 69 with a shifted distance toward one side of the copper band 60. The other row of continuous terminals 64 passes a second semi-circular rail 80, turns around and enters a shifting device 68 with another shifted distance toward another side of the copper band 60 opposite to the one side. Therefore, the two rows of continuous terminals 62 and 64 can enter, in parallel, the press die 76 from the two sides of the copper band 60 for being pressed and crimped.

It is only necessary to design the two shifting devices 68 and 69 having opposite spiral directions so as to shift the two rows of continuous terminals 62 and 64 to different sides of the copper band 60, respectively. It is preferred that the radius of the second semi-circular rail 80 is larger than that of the first semi-circular rail 78. Thus, the two rows of continuous terminals 62 and 64 can travel more smoothly due to the height difference between the two rows of continuous terminals 62 and 64 when the continuous terminals 62 and 64 are turning around.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A shifting device for shifting continuous terminals, the continuous terminals comprising a first row of continuous terminals and a second row of continuous terminals opposite to the first row of continuous terminals, the shifting device comprising:

a body formed with a hole and an inlet and an outlet both communicating with the hole, a direction into the inlet and a direction out of the outlet being the same, the inlet being shifted a predetermined distance away from the outlet; and a shaft fitted with the hole of the body and defining a spiral channel with the body after fitting with the hole of the body, the spiral channel corresponding to the inlet and the outlet of the body, wherein the second row of continuous terminals enters the spiral channel from the inlet and goes out of the spiral channel from the outlet while the first row of continuous terminals travels over the inlet such that the second row of continuous terminals is shifted the predetermined distance away from the first row of continuous terminals at the outlet.

2. The shifting device according to claim 1, wherein the shaft is formed with a spiral slot on its surface, and the spiral channel is defined within the body when the shaft is fitted with the hole.

3. The shifting device according to claim 1, wherein a horizontal conduit, through which the second row of continuous terminals passes, is provided at each of the inlet and the outlet of the body.

4. The shifting device according to claim 1, wherein a depth of the slot of the shaft is slightly greater than a thickness of the each of the continuous terminals.

* * * * *